June 29, 1965    J. W. CORCORAN    3,191,516
QUICK ACTING SHUTTER
Filed May 11, 1961    2 Sheets-Sheet 1

INVENTOR.
JOHN W. CORCORAN
BY
Fryer + Tjensvold
ATTORNEYS

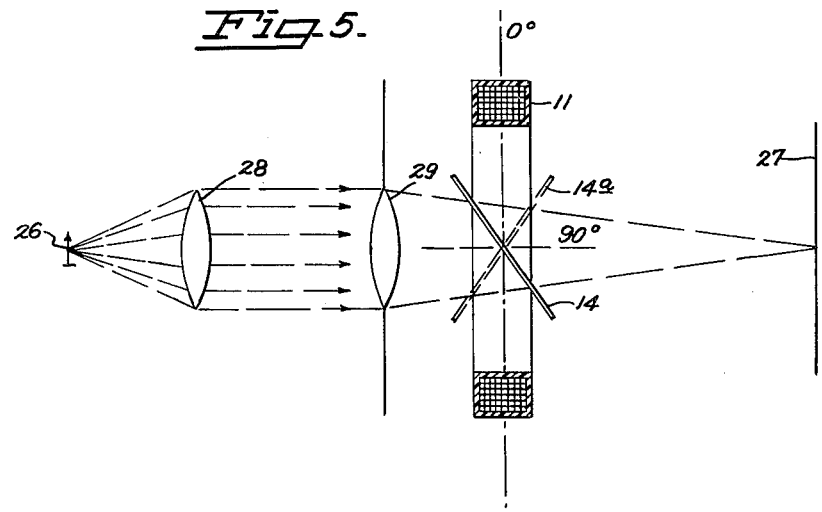
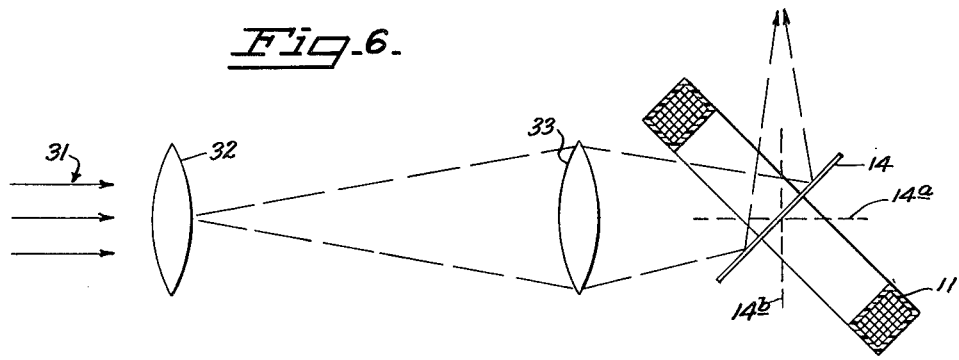

United States Patent Office 3,191,516
Patented June 29, 1965

3,191,516
QUICK ACTING SHUTTER
John W. Corcoran, Redwood City, Calif., assignor, by mesne assignments, to Beckman & Whitley, Inc., San Carlos, Calif., a corporation of Delaware
Filed May 11, 1961, Ser. No. 109,396
6 Claims. (Cl. 95—59)

The present invention relates to quick acting gates, and more particularly to non-destructive, electrically operated quick acting gates.

Means for quickly opening and/or closing an aperture are useful in numerous arts and most widely used in the photography art. In high speed photography, framing cameras and streak cameras are utilized to photograph events which endure no longer than a few micro-seconds. Periodically the need arises for a shutter capable of opening an aperture in a period of the order of 10 to 100 micro-seconds. While there are several fast methods of closing an aperture, no correspondingly fast, synchronizable, method exists for opening an aperture.

The present invention provides a quick acting gate which provides means for opening an aperture in 10 to 100 micro-seconds and has the added advantages of being electrically driven, which allows it to be accurately synchronized with an event, and it is reusable (non-destructive). The present invention achieves these results utilizing a substantially circular, flat disc of electrically conductive material as the gating member. The disc is disposed in a region through which magnetic flux lines pass when a magnetic field producing means of the invention is energized. The disc is pivoted about a diametric axis which is generally perpendicular to the magnetic field.

When the magnetic field producing means is energized, flux which intercepts the gating disc induces a current to flow therein, and the interaction of the disc current with the magnetic field, produces forces acting on the disc which cause it to rotate.

A basic problem encountered in driving a mechanical device to high speeds is physical deformation of the device. A gate driven to open in 10–100 micro-seconds from a rest position will experience accelerating forces of from $10^4$ to $10^5$ g. Under such forces the gating member will tend to distort if not fail in tension, compression or bending completely. The geometry of the present invention, however, allows the gating disc to experience these high accelerations with minimal deformation. It is, therefore, possible to utilize the moving disc not only as a shutter but at the same time as a mirror reflector, and still not produce serious error due to mirror distortion.

Accordingly it is an object of the present invention to provide a quick acting gate which is extremely fast opening, electrically driven and reusable.

It is another object of the present invention to provide a fast opening gate, the driving forces of which are advantageously distributed to produce only minimal distortion during operation and can thereby provide a moving mirror surface of sufficient quality to be used as a rotor in a streak or framing camera.

It is another object of the present invention to provide a quick acting gate which can be accurately synchronized so as to operate within a few micro-seconds of an electrically initiated event.

It is yet another object of the present invention to provide a fast acting mechanical shutter for a camera, which can be reused by a simple resetting of position.

In the drawings:

FIG. 5 is a schematic illustration of the present invention used as a shutter for a camera; and FIG. 6 is a schematic illustration of the present invention used as a shutter-mirror combination for a high speed camera.

Figure 1:
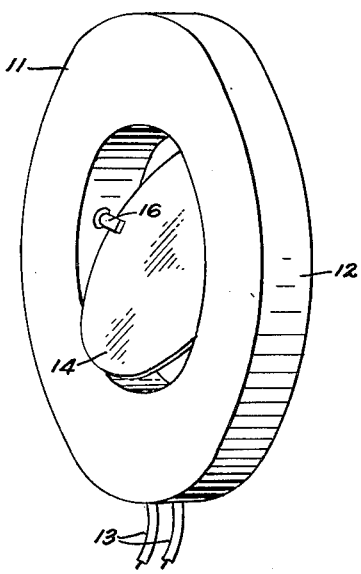
FIG. 1 is an isometric illustration of an embodiment of the gate of the invention.

Referring now to FIG. 1 an air solenoid 11 having generally annular geometry establishes a magnetic field when energy is supplied to its coil winding 12 through conductors 13. A flat disc 14 of electrically conductive material (e.g. aluminum) is pivotally mounted inside the solenoid 11 so as to be rotatable about one of its axis. Although disc 14 is preferably circular any disc having a planar axis of symmetry will be suitable and allow a balanced force to be established thus being capable of operation as herein described. Disc 14 is preferably of a diameter only slightly less than the inner diameter of the solenoid 11. In this way efficient magnetic coupling is insured to effect rotative movement of the disc. Bearings 16 (one not shown) retain disc 14 in the desired position in a rotatable manner.

Figure 2:
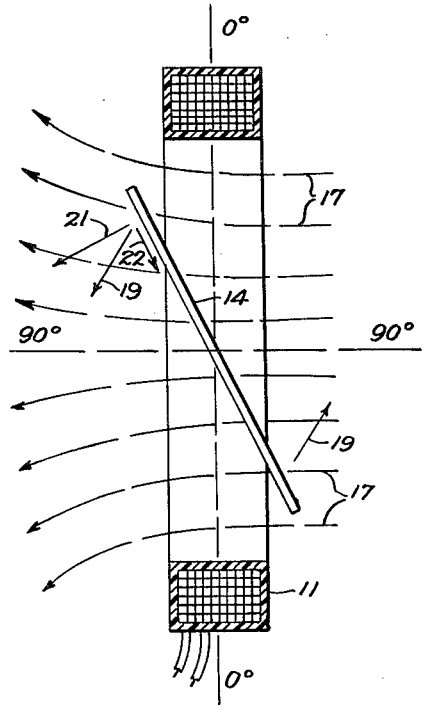
FIG. 2 is a sectional view of the gate of FIG. 1 schematically showing the magnetic field produced when the coil is energized.

Referring to FIG. 2, solenoid 11 is energized by an electrical source (not shown) and establishes a magnetic field as indicated by flux lines 17. Flux lines 17 intercept disc 14 and cause a current to flow therein. The current induced to flow in disc 14 is much the same as the current induced to flow in the secondary of a transformer when there is magnetic coupling. Disc 14 can be considered as a single shorted turn transformer secondary with solenoid 11 as the transformer primary.

The amount of current that flows in disc 14 in response to a unit of magnetic flux 17, is determined by the coefficient of coupling which is, inter alia, dependent upon the position of disc 14. When disc 14 is parallel to the plane of solenoid 11 (in the 0° position) the largest amount of flux per area of disc will be intercepted and the largest amount of current will be induced. At an angle 90° from this maximum induced current position, (disc 14 perpendicular to the plane of solenoid 11), no flux will be intercepted and therefore no current will flow in the disc.

Figure 3:
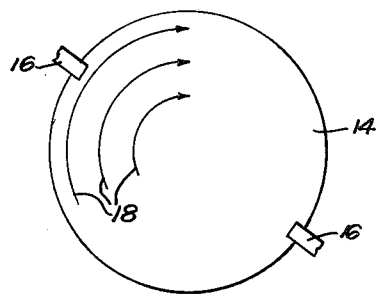
FIG. 3 is a plan view of the disc of the gate of the invention with current paths illustrated thereon.

It is well known that a current carrying member in a magnetic field experiences a force and that the force experienced can be represented by a vector perpendicular to the plane determined by the current and flux vectors. The current that flows in disc 14 is seen in FIG. 3 to follow paths 18 which are circular and generally uniformly distributed over the surface of the disc. Thus each portion of disc 14 is a current carrying member and each, therefore, experiences a force.

The force vectors acting upon disc 14 as a result of the interaction of the magnetic field and current is in the general direction indicated by vector 19 of FIG. 2. It is to be noted that the forces about the axis of rotation of the disc are oppositely directed and therefore combine to give rise to rotation of disc 14 about its axis. Vector 19 is comprised of a force represented by vector 21 which is perpendicular to disc 14 and therefore a rotational force, and a force represented by vector 22 which is tangential to disc 14 and inwardly directed. Force 22 is compressive which helps to keep the disc from deforming during high acceleration. Thus, every elemental area of disc 14 experiences a force which is both compressive and rotational. By this geometry a minimum of stress is produced within the disc during operation since no part of the disc has to transmit a force to any other part; each part having its own driving force.

When disc 14 lies in the plane of solenoid 11, (the 0° position) the forces 19 are all compressive and no rotational force exists. When disc 14 is perpendicular to the plane of solenoid 11 (90° position) a force 19 produced would be all rotational and no compressive force would exist. Bearing in mind, however, the way that the current in the disc is dependent upon the position of the disc it is seen that when the current is at maximum the rotational force is zero, and when the current is zero the rotational force would be in the most advantageous direction. Thus the position of maximum rotational force is approximately midway between the maximum and minimum of current or rotational vector position; that would be approximately 45° from the plane of solenoid 11.

Forces 19 acting on disc 14 cause the disc to move towards the 90° position. When the 90° position is reached the induced current in disc 14 goes to zero (due to the magnetic coupling going to zero) along with the forces 19. The momentum of disc 14 when it reaches the 90° position will be sufficient to carry it through that position in spite of the absence of forces 19. When disc 14 passes the 90° position, a current is again induced, but in a direction opposite to that induced when the disc was on the other side of the 90° position. The reversed direction of the current causes forces 19 to reverse in direction and act to move disc 14 back toward the 90° position. Thus, whenever disc 14 is in a position other than the 0° or 90° positions, forces 19 will be in a direction to drive disc 14 to the 90° position.

Figure 4:
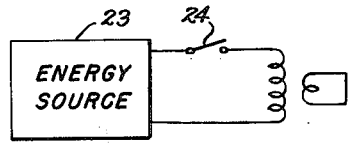
FIG. 4 is an electrical schematic diagram of a circuit of the present invention.

Referring now to FIG. 4, an energy source 23 supplies energy to coil 12 of solenoid 11 when a switch 24 is closed. Disc 14 (which is equivalent to a shorted, single-turn secondary) is magnetically coupled to coil 12 and receives energy therethrough. Energy source 23 is any one of a number of standard designs depending upon the particular use to which the gate is to be put. The amount of energy required of source 23 is directly related to the third power of radius of the aperture to be opened. Thus small increase in aperture size may require large energy increases from source 23 if the speed of opening is to be maintained.

A distinct advantage of the present invention is its ability to move a gate (disc 14) from rest, at extreme accelerations to high speed, and then back to rest again at extreme decelerations, without causing damage to the gate. This operation is also carried out with considerable precision. The stopping position of disc 14 once it has been put in motion depends upon a number of factors which include the starting position, the shape of the energy pulse from source 23, the physical dimensions of the disc, the magnitude of the energy delivered to solenoid 11 and the system losses.

Referring again to FIG. 2, disc 14 is started in a rest position of approximately 45° (midway between the 0° and 90° positions) and is accelerated toward the 90° position when a magnetic field is established by solenoid 11 as described above. If the energy from source 23 (FIG. 4) is of such duration as to exist only for the time that disc 14 is between its rest position and the 90° position, no retarding force will be present when the disc passes the 90° position and it will spin freely until the bearing friction is sufficient to stop it (assuming no mechanical stops). If, however, source 23 delivers an energy pulse of duration such as to be present when disc 14 passes the 90° position retarding forces will be created and disc 14 will come to rest when the retarding forces overcome the momentum of the disc. By accurately timing and shaping the energy delivered to solenoid 11, disc 14 can be stopped in any desired position by having the energy terminate at the time when a rest position has been achieved. For systems requiring extremely high precisioned stopping positions, mechanical stops can be employed. Damage to disc 14 will not result due to the use of mechanical stops since the disc can be brought to very nearly rest by magnetically induced forces acting over the entire disc prior to contact with the mechanical stop.

By variations in the shape of energy pulses or wave forms from source 23, the disc can be made to oscillate a set number of times about the 90° position, or make complete revolutions, or simply go from closed, to open, to closed in extremely short times (between 10 and 100 micro-seconds).

Thus the present invention provides a quick acting gate which can be electronically synchronized and operated to meet a variety of requirements. The use of the present invention as a camera shutter is illustrated in FIG. 5. An object 26 is shown to be recorded upon a film at plane 27 by light passing through lenses 28 and 29. By disposing the gate of the present invention in the light path, as between the lenses and the film plane it will serve as a quick acting shutter to time the exposure of the film with an event that occurs at the location of the object. With the disc in a rest position of approximately 45° from the plane of solenoid 11, the beam of light from the lens system is intercepted.

By synchronizing the occurrence of an event at the location of the object 26 with the deliverance of energy to solenoid 11 (this is readily accomplished when the event is capable of electrical initiation) light from the event will be allowed to reach film plane 27. By proper design of the shape and magnitude of the energy delivered to the solenoid 11, the time of movement of the disc from closed to open and back to a closed position represented at 14a can be preselected to establish a desired exposure time. The ability to synchronize the opening of the disc 14 with the occurrence of an event insures that the photographic record is made at the proper instant. The rapid action of the disc produces extremely quick shuttering. Simply resetting disc 14 to its initial position conditions it for reuse.

A further use of the quick acting gate of the present invention in connection with photography is illustrated in FIG. 6 wherein disc 14 is finished to act as a mirror. Solenoid 11 is disposed at such an angle that when disc 14 is in an initial rest position of approximately 45° from the plane of solenoid 11 as indicated by dotted line 14b, the disc will be normal to light 31 from an object or event (not shown). A lens system represented by lenses 32, 33 directs light onto the mirrored surface of the disc. When the disc is in initial position 14b, light will be reflected back toward its source. As the disc 14 moves from position 14b to a final position represented by dotted line 14a in response to a signal from an energy source, light 31 will be reflected at an angle and swept through a 90° arc. This moving beam may be utilized with well known optical elements to expose a film for producing a photographic record in the manner of a rotating mirror camera of either the streak or framing type.

Again the advantage of synchronization and high speed allow results which are superior in many respects to those achieved by rotor systems which are used in the art. Because of the non-distorting feature of the gate of this invention, the mirrored surface of disc 14 remains optically accurate throughout its operation. Because the initial position of the reflected beam is known a most efficient use of the moving beam and film used can be obtained.

The present invention is adaptable to various uses such for example as particle beam studies, light choppers, valves for low level air streams, etc. Thus it is not intended that the invention be limited to use in the photographic art or to those few embodiments herein presented for illustrative purposes.

What is claimed is:

1. In a quick acting camera shutter the combination comprising an air solenoid of generally annular geometry, a generally circular opaque disc of non-magnetic electrically conductive material rotatably mounted about a line which is substantially a diameter of said disc and the opening in said solenoid, said disc having no diameter greater than the inner diameter of said solenoid, and electrical energy means for energizing said solenoid.

2. In a shutter-rotor for a camera the combination comprising an air solenoid of generally annular geometry, a generally circular disc of electrically conductive material rotatably mounted about a line which is substantially a diameter of said disc and the opening in said solenoid, a face of said disc having a mirror finish, and electrical energy means for energizing said solenoid.

3. In a quick acting gate the combination comprising an air solenoid of generally annular geometry, means for energizing said solenoid, and a generally circular disc of non-magnetic electrically conductive material rotatably mounted in the central region of said solenoid, said disc rotatably mounted about a line which is substantially a diameter of both said disc and the opening in said solenoid, said disc having no diameter greater than the inner diameter of said air solenoid.

4. In a quick acting gate the combination comprising; means responsive to electrical energy by the establishment of a magnetic field, and a generally circular disc of non-magnetic electrically conductive material disposed to intercept said magnetic field, said magnetic field operative to induce a current in said disc when said field is initially established, said disc being rotatably supported about a line which is also substantially a diameter of said disc, said disc urged to rotate by the force produced by the inter-action of the induced currents and the established magnetic field.

5. In a quick acting gate the combination comprising; an annular air solenoid responsive to the receipt of electrical energy to establish a magnetic field, a circular disc of non-magnetic electrically conductive material rotatably mounted within the central opening of said solenoid to rotate about a line which is a diameter of said disc in said solenoid, the establishment of a magnetic field by said air solenoid operative to induce a current to flow in said circular disc, said induced currents coacting with the magnetic field to produce forces which act over essentially the entire surface of said disc in such magnitudes and such distribution as to induce equal angular acceleration of each portion of said disc.

6. In a quick acting gate the combination comprising, means responsive to electrical energy by the establishment of a magnetic field; an electrical energy source capable of producing electrical energy pulses of less than one-tenth of a second duration for energizing said first-named means; and a circular disc of electrical conductive material disposed to intercept said magnetic field, said disc being rotatably supported about a line which is also a diameter of said disc.

References Cited by the Examiner

UNITED STATES PATENTS

| 709,837 | 9/02 | Wheeler | 95—58 |
| 3,020,816 | 2/62 | Frenk | 95—58 |

FOREIGN PATENTS

| 641,622 | 8/50 | Great Britain. |

EVON C. BLUNK, *Primary Examiner.*

JOHN M. HORAN, NORTON ANSHER, *Examiners.*